United States Patent
Yu et al.

(10) Patent No.: US 12,493,894 B2
(45) Date of Patent: Dec. 9, 2025

(54) SYSTEMS AND METHOD TO FACILITATE MODELING RESPONSES TO VARIABLE VALUES

(71) Applicant: Walmart Apollo, LLC, Bentonville, AR (US)

(72) Inventors: Pingjian Yu, Plano, TX (US); Jianbo Gu, Bentonville, AR (US); Wenyue Shi, Bentonville, AR (US); Siddharth Hareendran, Bentonville, AR (US); Yunus Kamal, Bentonville, AR (US); Pawan R. Natarajan, Fayetteville, AR (US); Philippe E. Bled, Broken Arrow, OK (US); Chinar Potnis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/884,297

(22) Filed: Sep. 13, 2024

(65) Prior Publication Data
US 2025/0095016 A1    Mar. 20, 2025

Related U.S. Application Data

(60) Provisional application No. 63/538,474, filed on Sep. 14, 2023.

(51) Int. Cl.
*G06Q 30/0201* (2023.01)
(52) U.S. Cl.
CPC .............................. *G06Q 30/0206* (2013.01)
(58) Field of Classification Search
None
See application file for complete search history.

(56) References Cited

U.S. PATENT DOCUMENTS

| | | | |
|---|---|---|---|
| 2003/0177103 A1 | 9/2003 | Ivanov et al. | |
| 2017/0308846 A1* | 10/2017 | de Mars | G06N 5/04 |
| 2019/0311383 A1* | 10/2019 | Menich | G06Q 30/0202 |
| 2019/0325507 A1 | 10/2019 | Rowley et al. | |
| 2023/0058632 A1 | 2/2023 | Ullas et al. | |

OTHER PUBLICATIONS

Ballard, John, "Here's Why Costco Can Continue Its Growth Streak", the Motley Fool, https://www.nasdaq.com/articles/heres-why-costco-can-continue-its-growth-streak-2021-10-13, Oct. 13, 2021 (Year: 2021).*

Mohammad, S. et al., An efficient algorithm to solve a multi-objective robust aggregate production planning in an uncertain environment:, The International Journal of Advanced Manufacturing Technology, Jun. 2012, pp. 765-782.

* cited by examiner

*Primary Examiner* — George Chen
(74) *Attorney, Agent, or Firm* — Foley IP Law, PLLC

(57) ABSTRACT

This disclosure provides techniques for facilitating modeling responses to variable parameters, and in particular embodiments, within the context of a price setting strategy for a retail club. A trained member response metric model may be trained using a training corpus. A modified price for a target item may be then be predicted, and used to calculate a predicted demand for the target item. The predicted demand may be used to calculate predicted sales of the target item, after which predict a member response metric score associated with the modified price may be determined using the first trained member response metric model and the predicted sales.

20 Claims, 6 Drawing Sheets

SYSTEMS AND METHOD TO FACILITATE MODELING RESPONSES TO VARIABLE VALUES

CROSS REFERENCE TO RELATED APPLICATION

This application claims priority to U.S. Provisional Application No. 63/538,474 filed Sep. 14, 2023, entitled "Systems and Method to Facilitate Modeling Responses to Variable Values", the entirety of which is incorporated herein.

BACKGROUND

Many retail stores set pricing to optimize sales or other performance metrics. As an example, the pricing of items may be set based on various factors, including perceived consumer demand, traffic in the store (e.g., monthly traffic, weekly traffic), a geographical location of the store, and other factors, e.g., time of year, etc. Improved techniques for setting the pricing of items in retail stores is desirable.

SUMMARY

Some embodiments provide a system to facilitate modeling responses to variable parameters, the system comprising a memory having a dataset stored therein and a control circuit operably coupled to the memory. The control circuit is configured to: generate a first trained member response metric model using a first training corpus that includes data from the dataset, determine a modified price for a target item, calculate a predicted demand for the target item based the modified price for the target item, calculate predicted sales of the target item based on the predicted demand, and predict a member response metric score associated with the modified price using the first trained member response metric model and the predicted sales. The member response metric score indicates a value representing a member's intent to renew a membership to a retail club. In one example, the first training corpus includes month-level member transaction feature data. In such an example, the month-level member transaction feature data may include any one or more of sale data, saving data, diversity index of item category, diversity index of visit, similarity between consecutive months, number of months from a last visit, return rate, online rate, self-checkout rate, application rate, club pick-up rate, and fuel rate. In another example, the first training corpus includes membership renewal data. In another example, the first training corpus includes statistical data of a geographical region associated with the retail club. In another example, the first training corpus includes relative price index level data for the retail club. In another example, the first trained member response metric model is based on a supervised logistic regression algorithm. In an example, the control circuit is further configured to generate one or more trained behavior models using a second training corpus, where the predicted demand is further determined using the one or more trained behavior models. In such an example, the second training corpus comprises any one or more of information regarding a region of a club, information regarding demo schedule, information regarding out of stock status, information regarding a plurality of related item pairs for each of a plurality of items, information regarding units and prices of items sold, information regarding time of transactions, and traffic information. In such an example, the one or more trained behavior models may each be based on a linear regression algorithm.

In an example, the control circuit is further configured to generate a basic elasticity model and a cross elasticity model using a second training corpus. The predicted demand is further determined using the basic elasticity model. The control circuit is further configured to determine predicted demands for related items using the cross elasticity model and the modified price for the target item and to integrate the predicted demand of the target item with the predicted demands for the related items. In such an example, the related items may be complementary items of the target item, substitute items of the target item, or a combination thereof.

Some embodiments provide a method that includes generating a first trained member response metric model using a first training corpus that includes data from a dataset, determining a modified price for a target item, calculating a predicted demand for the target item based the modified price for the target item, calculating predicted sales of the target item based on the predicted demand, and predicting a member response metric score associated with the modified price using the first trained member response metric model and the predicted sales. The member response metric score indicates a value representing a member's intent to renew a membership to a retail club.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a block diagram of a system for modeling responses to variable parameters in accordance with embodiments of this disclosure;

Corresponding reference characters indicate corresponding parts throughout the drawings.

DETAILED DESCRIPTION

Figure 1:
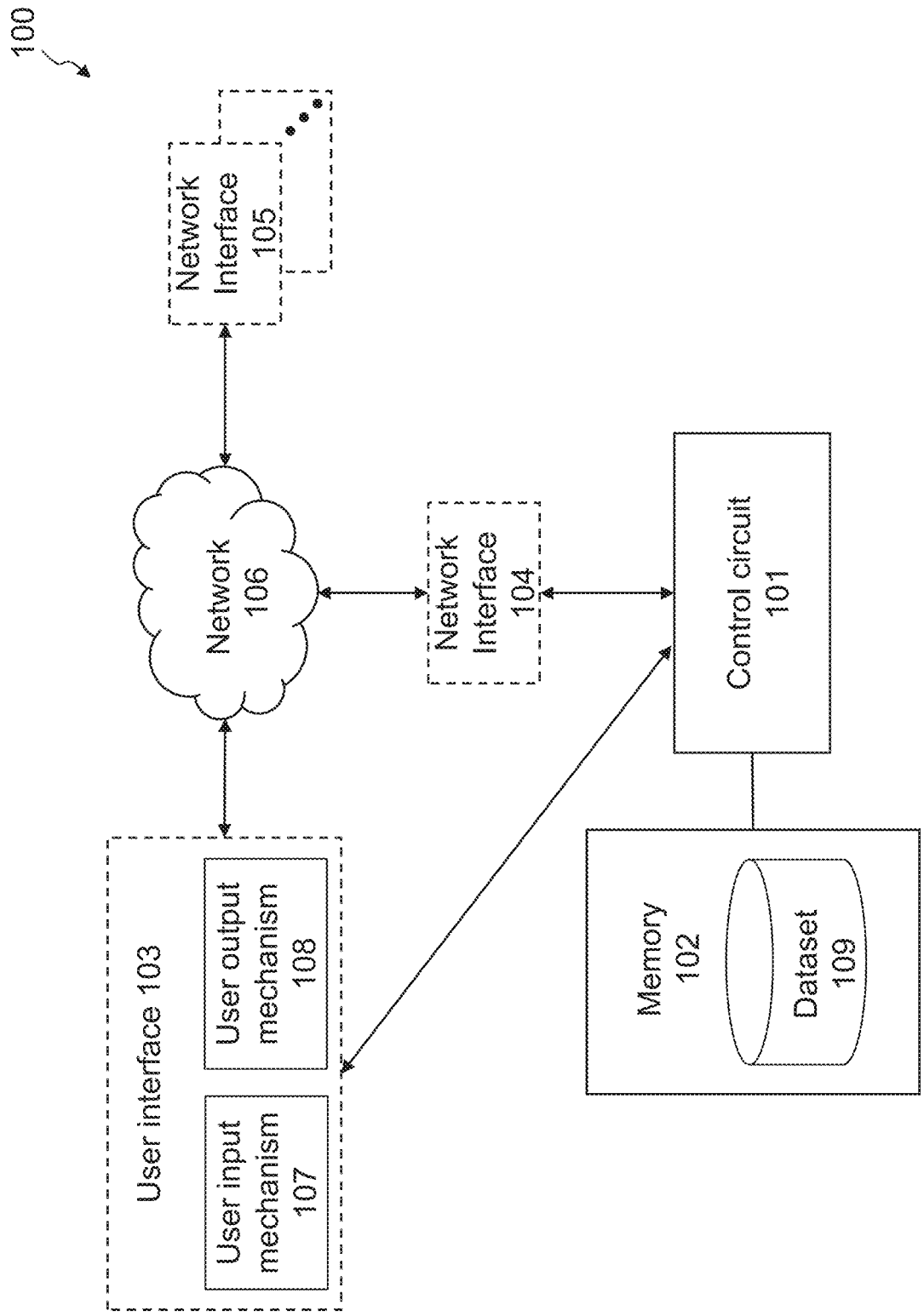
FIG. 1 is an exemplary block diagram illustrating . . .

Generally speaking, pursuant to various embodiments, systems, apparatuses, and methods are provided herein useful to facilitate modeling responses to variable values. In some embodiments, a system to facilitate modeling responses to variable parameters comprises a memory having a dataset stored therein, a control circuit operably coupled to the memory and configured to select particular data from the dataset to provide a first training corpus, generate, with the first training corpus, a first trained machine learning model, determine a modified parameter for a target item, predict a first result associated with the modified parameter for the target item, calculate, based on the first result, one or more updated variables, and predict, using the first trained machine learning model and with the one or more updated variables a metric score associated with the modified parameter. These teachings may facilitate modeling members' responses to changes of variable parameters, such as a change of prices of items. These teachings will also accommodate use of a supervised logistic regression algorithm to predict the metric scores.

These teachings are highly flexible in practice and will accommodate a first training corpus comprising a variety of different kinds of information. Examples include, but are not limited to, month-level member transaction feature data, membership renewal data, statistical data of geographical regions where clubs are located, and data of relative price index level for each of the clubs. By one approach, examples of the month-level member transaction feature data include, but are not limited to, sale data, saving data, diversity index of item category, diversity index of visit, similarity between consecutive months, number of months from a last visit, return rate, online rate, self-checkout rate, application rate, club pick-up rate, and fuel rate.

By one approach, these teachings can further provide for predicting, based at least on the predicted metric score, an impact caused by changing an original parameter as regards the modified parameter. These teachings may facilitate modeling impacts to change of variable parameters, such as change of prices of items.

In some embodiments, these teachings may provide for predicting the first result associated with the modified parameter for the target item by, at least in part, selecting particular data from the dataset to provide a second training corpus, generating, by training with the second training corpus, one or more trained behavior models, and predicting, using the one or more trained behavior models, the first results associated with the modified parameter for the target item. By one approach, examples of a second training corpus include but are not limited to information regarding regions of clubs, information regarding demo schedule, information regarding out of stock status, information regarding a plurality of related item pairs for each of a plurality of items, information regarding units and prices of items sold, information regarding time of transactions, and traffic information. In some approaches, the one or more behavior models are each based on a linear regression algorithm.

By some approaches, these teachings may provide for predicting, with the one or more behavior models, the first result associated with the modified parameter for the target item by, at least in part, predicting, using the basic elasticity model, a demand of the target item with the modified parameter for the target item, predicting, using the cross elasticity model, demand for one or more related items with the modified parameter for the target item, and integrating the predicted demand of the target item and the predicted demands of the one or more related items. These teachings will also accommodate use of an item identification model to identify one or more related items of the target item (e.g., complementary items of the target item and substituted items of the target item). In some embodiments, these teachings may increase the accuracy in modeling members' responses to changes of variable parameters, such as a change of prices of items.

In some embodiments, these teachings may further provide for predicting a plurality of metric scores associated with a plurality of candidate parameters, consolidating the plurality of metric scores associated with the plurality of candidate parameters to provide consolidated metric scores, generating an objective function based, at least in part, on the consolidated metric scores, and optimizing the objective function using multi-objective optimization. These teachings may be useful in reducing the loss related to the change of parameters.

As mentioned, these teachings are highly flexible in practice. By one approach, these teachings can provide for providing a dataset related to vehicle components, selecting information regarding materials of each vehicle component from the dataset to provide a first training corpus, generating, with the first training corpus, a first trained machine model, determining a modified percentage of steel in the wheel alloy as a modified parameter, predicting, as a first result, crashworthiness of the wheel associated with the modified percentage of the steel in the wheel alloy, calculating, based on the predicted crashworthiness of the wheel, an expected life of the vehicle as an updated variable, and predict, using the first trained machine learning model and with the expected life of the vehicle, a metric score for a safety score of the vehicle associated with the modified percentage of the steel in the alloy for a wheel.

These and other benefits may become clearer upon making a thorough review and study of the following detailed description. Referring now to the drawings, and in particular to FIG. 1, an illustrative system 100 that is compatible with many of these teachings will first be presented.

In this particular example, the system 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out or send signals to carry out one or more of the steps, actions, and/or functions described herein.

The control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

The memory 102 may provide storage of a dataset 109. By some approaches, the dataset 109 may be a collection of data associated with members-based clubs. As used herein, the expression "members-based clubs" will be understood to refer to an establishment that limits entry and/or the ability to conduct transactions to persons or entities that are recognized as members of that establishment. Common examples in the United States include Sam's Club and Costco facilities.

In some embodiments, the dataset may include, but is not limited to, club information, demo information regarding the date that associate showcases an item to members in a club, inventory information, item information, transaction information, and membership information. The club information may include club level information such as information regarding the geographical region where each club is located. The club information may further include statistical data (e.g., household income, Gini index) of a geographical region (e.g., county) where each club is located. The demo information may include demo schedule of each item in each club. The inventory information may include information regarding inventory status, such as out of stock status of each item. The item information may include information regarding details of each item, such as a product name, size, etc. The item information may further include shopping basket data. The shopping basket data may include information regarding the contents of members' shopping basket. The transaction information may include transaction details such as list of items sold, unit of items sold, unit price of items sold, transaction time, and membership identification (ID) associated with each transaction. The transaction information may also include traffic information. The membership information may refer to data collected and organized based on each membership. For example, the membership information may be a collection of each member's data. The availability and use of such membership information can be strictly limited based on the specific permissions provided by the members themselves and/or as may be otherwise limited by local laws and regulations. In some embodiments, membership information is collected and stored based on each member's membership ID without using members' personal information. If desired, these teachings will also accommodate requiring a member's express permission to use some or all of the information identified herein. By some approaches, the membership information may include, but is not limited to, membership ID, information regarding members' visits to clubs, information regarding members' returns, information regarding members' membership tier, and information regarding members' membership renewal.

In addition to the dataset 109, the memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach, the control circuit 101 operably couples to a user interface 103. This user interface 103 can comprise any of a variety of user-input mechanisms 107 (such as, but not limited to, keyboards and keypads, cursor-control devices, touch-sensitive displays, speech-recognition interfaces, gesture-recognition interfaces, and so forth) and/or user-output mechanisms 108 (such as, but not limited to, visual displays, audio transducers, printers, and so forth) to facilitate receiving information and/or instructions from a user and/or providing information to a user.

In another optional approach, in lieu of the foregoing or in combination therewith, the control circuit 101 operably couples to a network interface 104. So configured, the control circuit 101 can communicate with other network elements 105 (both within the system 100 and external thereto) via the network interface 104 (and any intervening communications/data networks 106 such as, but not limited to, the Internet). Numerous examples of such interfaces are known in the art. A non-exhaustive listing would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces.

Figure 2:
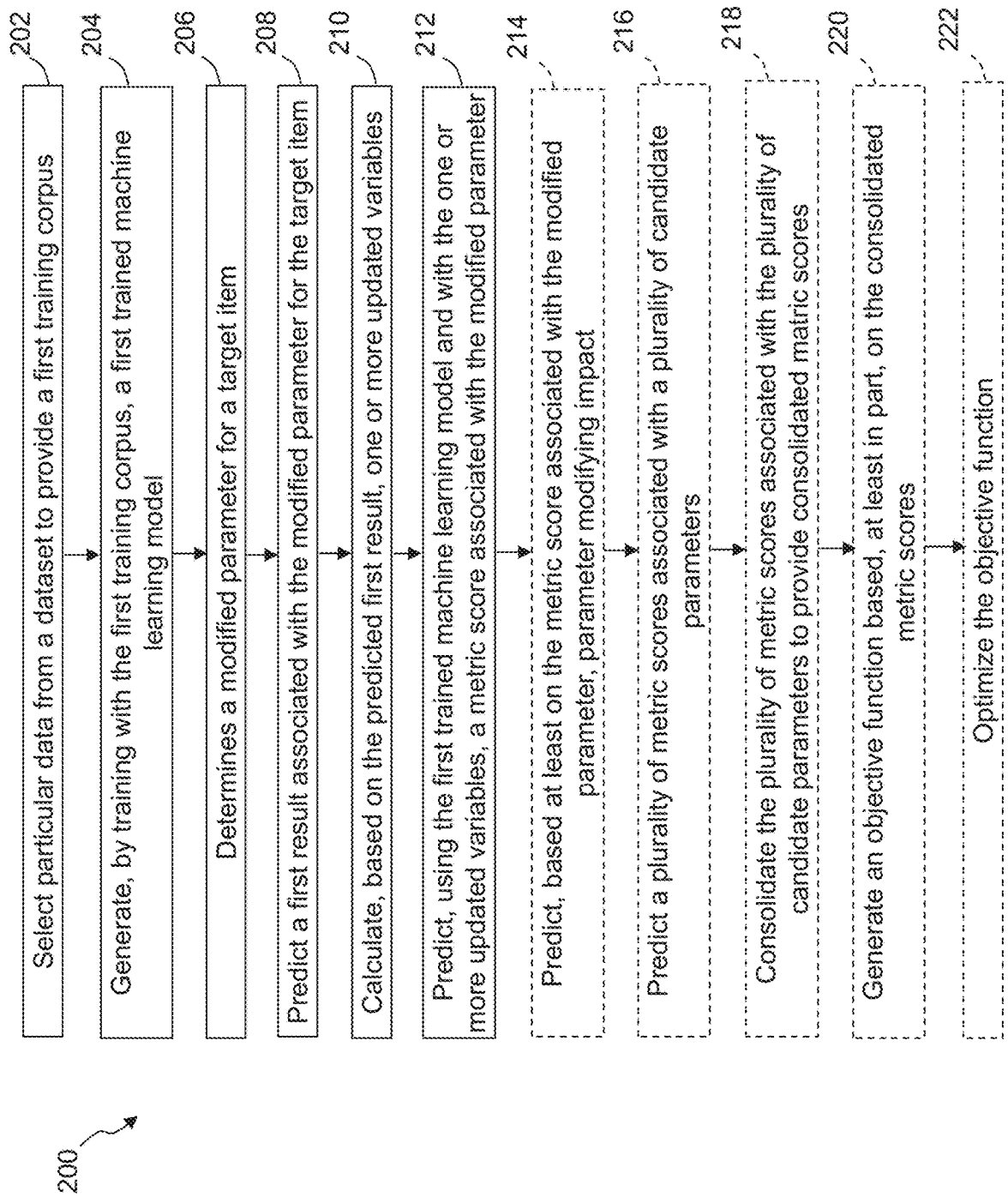
FIG. 2 is a flowchart of an embodiment method for modeling responses to variable parameters.

FIG. 2 is a flowchart depicting an exemplary method 200 to facilitate modeling responses to variable parameters. The method 200 may be performed using the system 100 in accordance with the approaches described above. Although the method 200 is mainly illustrated with the system 100, the method 200 may also be performed with a system differently configured.

In step 202, the system 100 selects particular data from the dataset associated with the members-based club to provide a first training corpus. In some embodiments, the system 100 may further process and/or analyze the selected data to provide the first training corpus.

By some approaches, the first training corpus may include, but is not limited to: month-level members transaction feature data; membership renewal data; statistical data of geographical regions where member-assigned retail clubs are located; and/or data of relative price index level for each of the member-assigned clubs.

By some approaches, the month-level members transaction feature data may be prepared by processing and analyzing the data selected from transaction information and the membership information. By some approaches, the month-level members transaction feature data may include, but is not limited to: month-level sale data; members' month-level saving data; month-level diversity index of members' item category penetration; month-level diversity index of members' visits; members' month-level behavior similarity data between consecutive months; number of months from members' last visits, month-level members' return rate; month-level members' online rate; month-level members' self-checkout rate; month-level members' application rate; month-level members' club pick-up rate; and/or month-level members' fuel rate.

As used herein, the expression "online rate" may refer to a rate of transactions using an online platform. The expression "self-checkout rate" may refer to a rate of transactions using a self-checkout device at clubs. The expression "application rate" may refer to a rate of transactions using an application (e.g., a Scan and Go app). The expression "club pick up rate" may refer to a rate of transactions using a club's pick-up service. The expression "fuel rate" may refer to a rate of fuel transactions.

By some approaches, the membership renewal data may include, but are not limited to, auto-renewal indicator and renewal status. By some approaches, the statistical data of geographical regions where member-assigned retail clubs are located may include information of the Gini index of counties where member-assigned retail clubs are located, and information of household income of counties member-assigned retail clubs are located.

In step 204, the system 100 generates a first trained machine learning model. The system 100 generates the first trained machine learning model by training a first machine learning model with the first training corpus. The first trained machine learning model may predict a metric score associated with various parameters. In some embodiments, the first trained machine learning model may be a trained member response metric model to predict a member response metric (MRM) score. The term "member response metric score" may refer to a value (such as an integer) that represents a member's intent to renew their membership. Viewed another way, the member response metric score is a proxy for an intent to renew. For a given scale or range, such as a range of integers from 1 to 10, higher values can represent a higher likelihood of intent to renew and vice versa.

In this example, the system 100 may train the member response metric model with the first training corpus based on a supervised logistic regression algorithm. With the trained first machine learning model, the system 100 may predict a metric score. Variables for the first machine learning model may include but are not limited to: sales of items; and/or savings the clubs provide to members.

In some embodiments, any one or more the following may further be a variable for the first machine learning model: month-level diversity index of members' item category penetration; month-level diversity index of members' visits; members' month-level behavior similarity data between consecutive months; number of months from members' last visits, month-level members' return rate; month-level members' online rate; month-level members' self-checkout rate; month-level members' application rate; month-level members' club pick-up rate; and month-level members' fuel rate, as well as auto-renewal indicator; renewal status; county Gini index; and/or county household income.

In step 206, the system 100 determines a modified parameter for a target item. The term "target item(s)" may generally refer to item(s) whose parameters are targeted to be modified. In some embodiments, the system 100 may determine the modified parameter by receiving an indication of a modified parameter for a target item from a user via the user input mechanism 107. By some approaches, instead of receiving an indication of a modified parameter for a target item, the system 100 may generate a plurality of candidate parameters and select one of the plurality of candidate parameters as a modified parameter to determine the modified parameter for the target item. By some approaches, the modified parameter may be a modified price for a target item.

Figure 3:
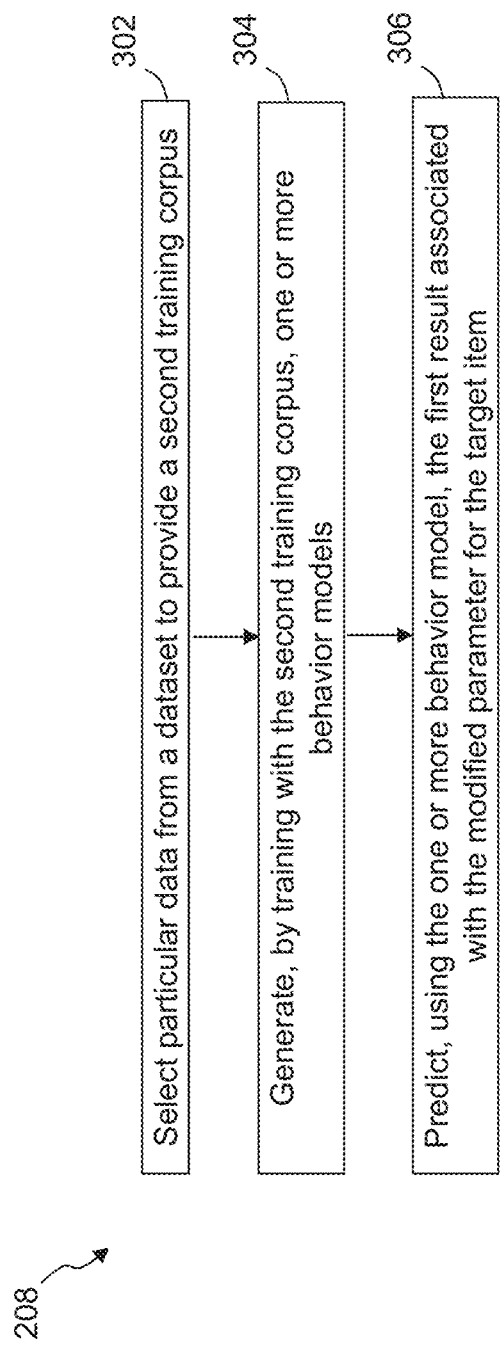
FIG. 3 is a flowchart of an embodiment for predicting a result associated with a modified parameter for the target item.

In step 208, the system 100 predicts a first result associated with the modified parameter for the target item. FIG. 3 illustrates an exemplary method to predict the first result associated with the modified parameter for the target item in step 208. It will be understood that the specific details in this example are intended to serve an illustrative purpose and are not intended to suggest any particular limitations as regards these teachings.

In this example, in step 302, the system 100 selects particular data from a dataset associated with the members-based club to provide a second training corpus. The system 100 may further process and/or analyze the selected data to provide the second training corpus. In some embodiments, the second training corpus may include, but is not limited to: information regarding regions of clubs; information regarding demo schedule; information regarding out of stock status; information regarding a plurality of related item pairs for each of a plurality of items; information regarding units and prices of items sold; information regarding time of transactions; and/or traffic information.

By some approaches, each physical establishment of a club may itself be used to indicate the regions of the clubs. The information regarding units and price of items sold may be information regarding units and price of items sold at item level, information regarding units and price of items sold at day level, information regarding units and price of items sold at club level, and/or any combination thereof. The information regarding time of transaction may include month of year and day of week of the transactions. The traffic information may be daily traffic at club level.

In step 304, the system 100 generates one or more trained behavior models by training the one or more behavior models with the second training corpus. The trained behavior models may predict a change of behavior in response to a change of parameters for an item.

In step 306, the system 100 predicts, using the one or more trained behavior model, the first result associated with the modified parameter for the target item. Although steps 302, 304, and 306 are described as an example of step 208, steps 302 and 304 may be performed prior to step 206. For example, the system 100 may select particular data from a dataset to provide a second training corpus and then generate, by training with the second training corpus, one or more trained behavior models, before determining a modified parameter for a target item in step 206. By some approaches, the steps 302 and 304 may be performed simultaneously with steps 202 and 204. By some approaches, the steps 302 and 304 may be performed before steps 202 and 204.

Figure 4:
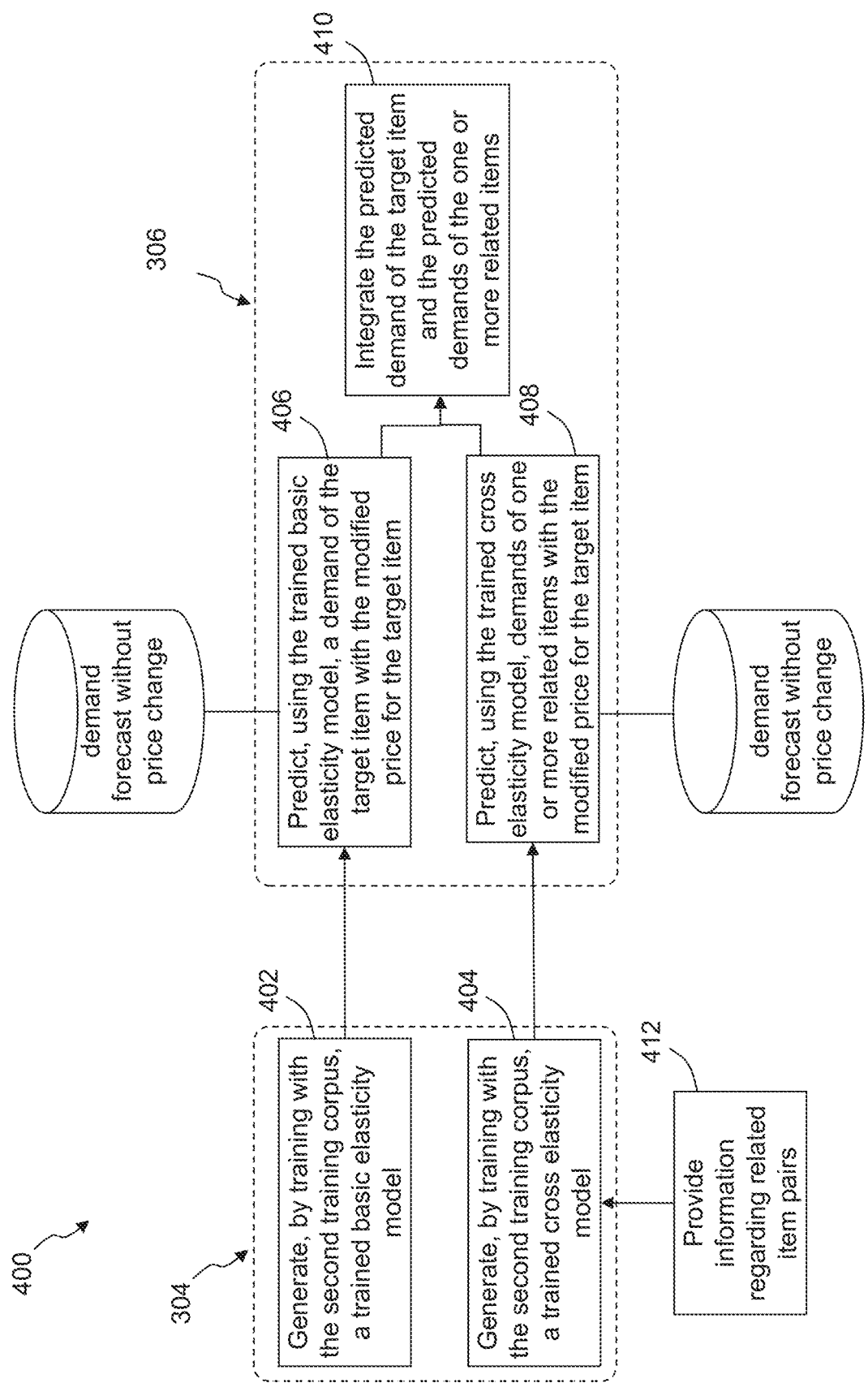
FIG. 4 is a flowchart of an embodiment for generating behavior models.

FIG. 4 illustrates an example method 400 to generate the one or more behavior models in step 304 and to predict the first result associated with the modified parameter for the target item in step 306. It will be understood that the specific details in this example are intended to serve an illustrative purpose and are not intended to suggest any particular limitations as regards these teachings. In the example method 400, the one or more behavior models may be one or more elasticity models, including a basic elasticity model and a cross elasticity model. Further, in the example method of 400, the modified parameter of the target item may be a modified price of the target item, and the first result associated with the modified parameter for the target item may be an integrated demand of items associated with the modified parameter for the target item.

In step 402, the system 100 generates, by training a basic elasticity model with the second training corpus, a trained basic elasticity model. In training, the basic elasticity model learns, using the second training corpus, basic elasticity. The term "basic elasticity" may refer to a function of demand of a target item in relation to price variation of the target item. In some embodiments, the system 100 trains the basic elasticity model based on a supervised linear regression algorithm.

In step 404, the system 100 generates, by training a cross elasticity model with the second training corpus, a trained cross elasticity model. In training, the cross elasticity model learns, using the second training corpus, cross elasticity. The term "cross elasticity" may refer to a function of demands of items that are related to a target item ("related items" or "cross items") in relation to price variation of the target item. As one simple example, marshmallows may be treated as an item that relates to graham crackers that serve as a target item. As shown in step 412, to generate the trained cross elasticity model, the system may also provide information regarding related item pairs (sometimes called "cross item pairs") to the cross elasticity model. In some embodiments, the system 100 generates the trained cross elasticity model by training the cross elasticity model with the second training corpus and the information regarding related item pairs. In some embodiments, the system 100 trains the cross elasticity model based on a supervised linear regression algorithm.

Each of the related item pairs may comprise a target item and one or more related items of the target item. The one or more related items include one or more complementary items of the target item and/or one or more substituted items of the target item. The expression "complementary items" may refer to items that induce or promote the purchase of the target item and appear frequently in the same shopping basket of the target item. The expression "substituted items" may refer to items that tend to be selected as a substitute for the target item. In some embodiments, the related item pairs may be identified by using an item identification model. The item identification model may be a natural language processing (NLP) model and the natural language processing model may identify the related item pairs based upon the contents of members' basket. By some approaches, the natural language processing model may use a Skipgram algorithm. By some approaches, the item identification model may be a Meta prod2Vec model.

In step 406, the system 100 predicts, using the trained basic elasticity model and based on data of demand forecast without parameter change/modification, a demand of the target item with the modified parameter for the target item. By some approaches, the demand forecast without parameter change may be prepared by another model. By some approaches, the demand forecast without parameter change may be based on historical data of demand of items.

In step 408, the system 100 predicts, using the trained cross elasticity model and based on the data of demand forecast without parameter change/modification, demands of the one or more related items with the modified parameter for the target item. By some approaches, the demand forecast without parameter change used in step 408 may be the same as the demand forecast without parameter change used in step 406.

In step 410, the system 100 integrates the predicted demand of the target item with the modified price for the target item and the predicted demands of the one or more related items with the modified price for the target item, such that the system 100 may predict the integrated demand of items associated with the modified price for the target item.

Referring back to FIG. 2, in step 210, the system 100 calculates one or more updated variables based on the first result predicted in step 208. For example, when the predicted first result is the integrated demand of items associated with the modified price for the target items, the system 100 may calculate predicted sales of items and predicted savings the clubs provide to members as the updated variables for the first trained machine learning model.

In step 212, the system 100 predicts, using the first trained machine learning model and with the one or more updated variables, a metric score associated with the modified parameter. In some embodiments, with predicted sales of items and predicted savings the clubs provide to members as the updated variables, the first trained machine learning model predicts a member response metric score associated with the modified parameter (e.g., a modified price) for the target item.

In optional step 214, the system 100 may predict, based at least on the metric score associated with the modified parameter predicted in step 212, an impact caused by changing an original parameter for the target item as regards the modified parameter for the target item. The expression "original parameter" may refer to a currently being applied/used parameter associated with the target item. In some embodiments, the impact predicted in step 214 may be an impact on membership income caused by a price change from the current price as regards a modified price. By some approaches, the system 100 may display the predicted impact via the user output mechanism 108.

In optional step 216, the system 100 may predict a plurality of metric scores associated with a plurality of candidate parameters. Each of the plurality of metric scores predicted in step 216 may be associated with each of the plurality of candidate parameters. The system may predict the plurality of metric scores by conducting steps 208 to 212 as regards the plurality of candidate parameters instead of the modified parameter. For example, to predict the plurality of metric scores for each of the plurality of candidate parameters, the system 100 predicts a plurality of first results associated with each of the plurality of candidate parameters in a manner similar to step 208, calculates, based on the plurality of predicted first results, a plurality of updated variables associated with each of the plurality of candidate parameters in a manner similar to step 210, and predicts, using the first trained machine learning model and with the plurality of updated variables, a plurality of metric scores associated with each of the plurality of candidate parameters in a manner similar to step 212.

In optional step 218, the system 100 may consolidate the plurality of metric scores associated with the plurality of candidate parameters to provide consolidated metric scores.

In optional step 220, the system 100 may generate an objective function based, at least in part, on the consolidated metric scores. Those skilled in the art will understand that an objective function typically comprises a loss function that is to be minimized (or the negative of a loss function, in which case maximization is sought) via optimization.

In optional step 222, the system may optimize the objective function using multi-objective optimization (sometimes referred to as multi-criteria optimization). In some embodiments, the optimization may be based on Pareto optimality. By some approaches, the optimization of the objective function may be with an augmented E-constraint method and/or Posteriori method.

For retail clubs (aka member-based clubs), membership premiums account for a significant portion of operating income. As such, membership renewal is a key performance indicator (KPI) in terms of business management and development. Aspects of this disclosure use machine learning to set price points for the purpose of optimizing membership renewals. More specifically, a trained member response metric model (i.e., a machine learning model) is trained using a dataset that contains data of the retail club. The data may include demo information regarding the date that associate showcases an item to members in a club, inventory information, item information, transaction information, and membership information. And the trained member response metric model may be used to set price points for items in a way that drives membership renewals. For example, the trained member response metric model may be trained based on past sales data at varying price points for the items in question, as well as based on how sales resulting from those price points impacted membership renewals. As an example, setting a low price point on high-volume items may drive sales and result in higher membership participation during the promotional period, which may in-turn incentivize members to renew based on how recency bias might influence their underlying perception of the value proposition provided by the underlying membership. As another example, setting a low price point on high ticket items, e.g., TVs, appliances, etc. during periods in which those items experience high demand, e.g., black Friday, may drive renewals. Determining which promotion to offer and when is computationally complex as it requires evaluating extremely large pools of data and making inferences that are difficult for humans to do without algorithmic assistance. Moreover, evaluating what specific price point to set can have significant impacts on the retail club's business performance. Setting a price point too low may forego needed profits without a justifiable increase in membership renewals. Aspects of this disclosure address these problems through the use of machine learning, and in particular by training the member response metric model to calculate predicted demand and predicted sales resulting from a price modification, which are then use to predict a member response metric score indicative of the members' intent to renew their memberships.

Figure 5:
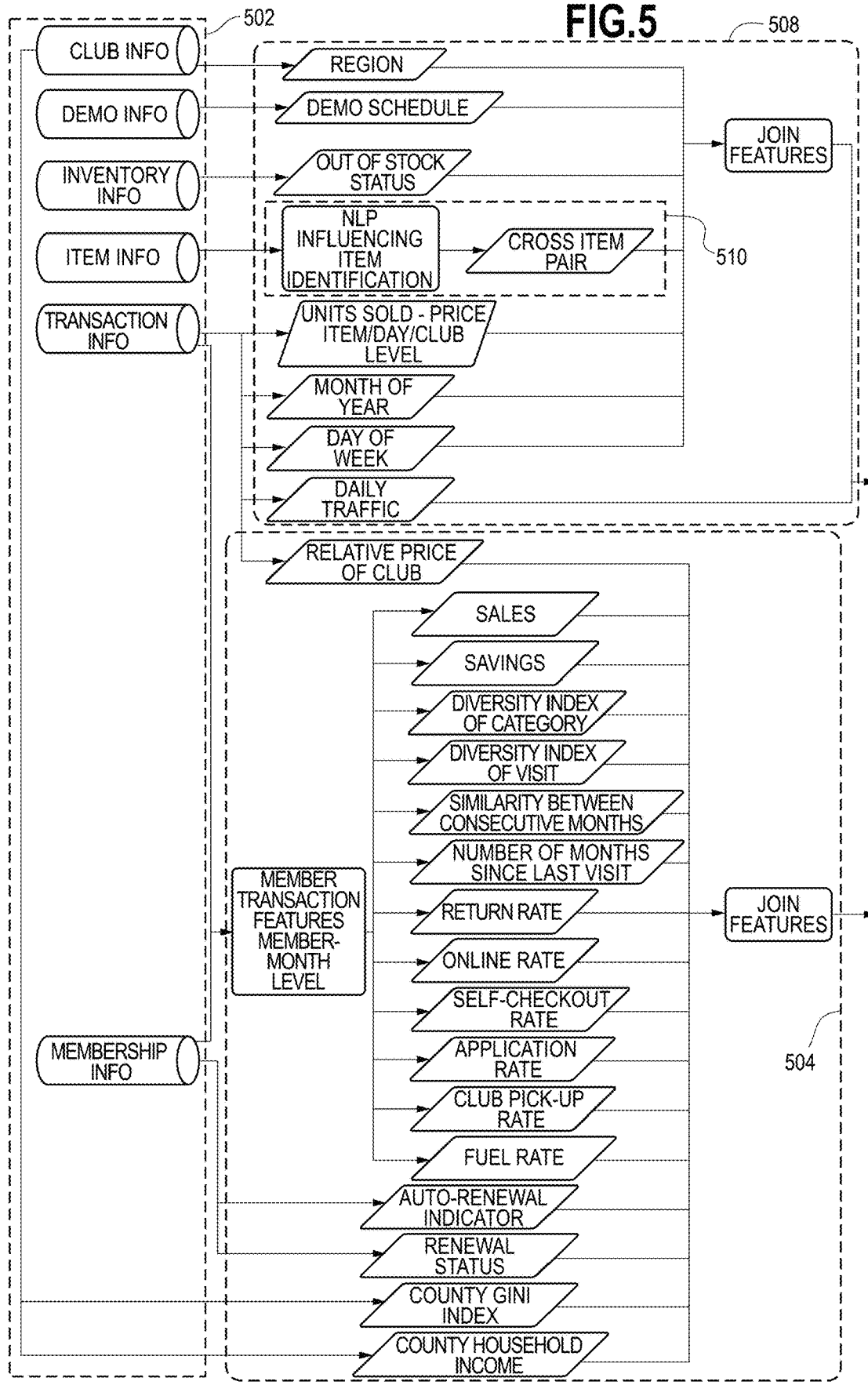
FIG. 5 is a block diagram of a database for modeling responses to variable parameters in accordance with embodiments of this disclosure.
Figure 5:
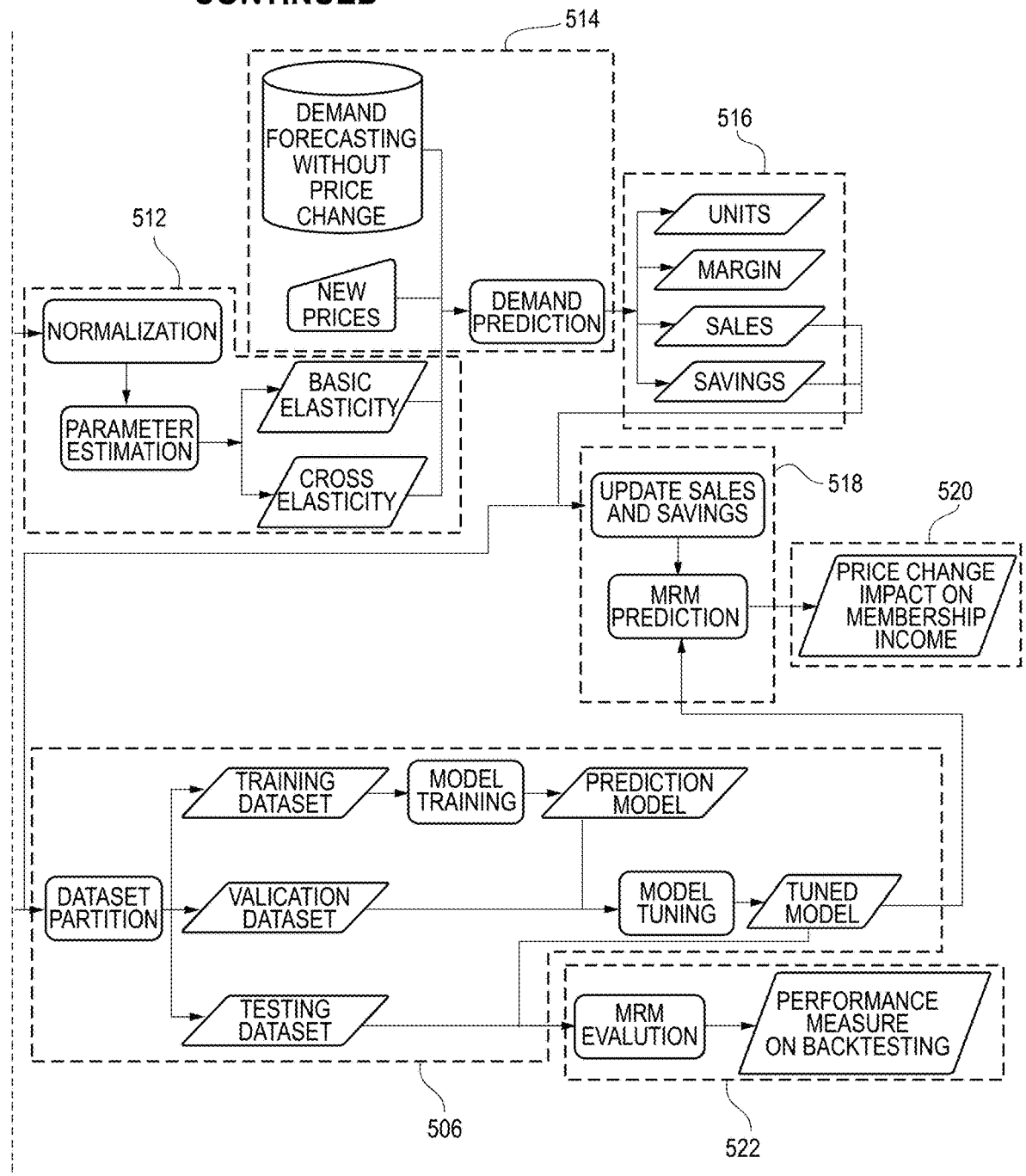

FIG. 5 provides an illustrative example in accord with these teachings. Again, the specific details of this example are intended to serve an illustrative purpose and are not intended to suggest any limitations with respect to these teachings.

As denoted at block 502, various data included in the data set associated with the members-based club are provided. In this example, club information, demo information, inventory information, item information, transaction information, and membership information are provided. As denoted at block 504, particular data are selected to provide the first training corpus. Block 506 illustrates generating the trained member response metric model (indicated as prediction model) by training with the first training corpus. As denoted at block 508, particular data are selected to provide the second training corpus. Block 510 illustrates identifying cross item pairs (related item pairs) using the natural language processing model. Block 512 illustrates generating the trained basic elasticity model and the trained cross elasticity model. Block 514 illustrates predicting, using the trained basic elasticity model and the trained cross elasticity model and with new prices for target items and data of demand forecasting without price change, a demand of items associated with the new prices for the target items. As denoted at block 516, units of items sold, margin from the sales, sales of items, and members' saving associated with the new prices are calculated. Block 518 illustrates predicting, using the trained member response metric model and with the sales of items and members' saving as updated variables, a member response metric scores associated with the new prices for target items. As denoted at block 520, price change impact on membership income may be further predicted based at least on the member response metric score. At block 522, the prediction with the member response metric model is evaluated.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system to facilitate modeling responses to variable parameters, the system comprising:
a memory having a dataset stored therein;
a control circuit operably coupled to the memory and configured to:
train a member response metric machine learning (ML) model using a first training corpus that includes data from the dataset, the trained member response metric ML model being trained to predict member response metric scores indicating values representing corresponding members' intent to renew membership to a retail club;
train a cross-elasticity ML model using a second training corpus that includes data from the dataset, the trained cross-elasticity ML model being trained to predict demand for complementary item(s) of a given target item based on a price variation of the given target item, wherein the complementary item(s) of the given target item have been identified as inducing or promoting a purchase of the given target item or vice versa;
identify a specific target item in a shopping basket of a member;
identify a complementary item of the specific target item; and
modify a price for the specific target item in the shopping basket to increase a membership response metric score for the member above a threshold, wherein modifying the price for the specific target item comprises using the trained cross-elasticity ML model to calculate a predicted demand for the complementary item based on the modified price for the specific target item and using the trained member response metric ML model to predict the membership response metric score for the member based on the modified price of the target item and the predicted demand for the complementary item calculate a predicted demand for the target item based the modified price for the target item.

2. The system of claim 1, wherein the first training corpus includes month-level member transaction feature data.

3. The system of claim 2, wherein the month-level member transaction feature data includes at least one:
sale data;
saving data;
diversity index of item category;
diversity index of visit;
similarity between consecutive months;
number of months from a last visit;
return rate;
online rate;
self-checkout rate;
application rate;
club pick-up rate; or
fuel rate.

4. The system of claim 1, wherein the first training corpus includes membership renewal data.

5. The system of claim 1, wherein the first training corpus includes statistical data of a geographical region associated with the retail club.

6. The system of claim 1, wherein the first training corpus includes relative price index level data for the retail club.

7. The system of claim 1, wherein the trained member response metric ML model is trained based on a supervised logistic regression algorithm.

8. The system of claim 1, wherein the second training corpus comprises any one or more of:
information regarding a region of a club;
information regarding demo schedule;
information regarding out of stock status;
information regarding a plurality of related item pairs for each of a plurality of items;
information regarding units and prices of items sold;
information regarding time of transactions; and traffic information.

9. The system of claim 1, wherein the cross-elasticity ML model is based on a linear regression algorithm.

10. A method comprising:
training, by one or more processors, a member response metric machine learning (ML) model using a first training corpus that includes data from a dataset, the trained member response metric ML model being trained to predict member response metric scores indicating values representing corresponding members' intent to renew membership to a retail club;
training, by the one or more processors, a cross-elasticity ML model using a second training corpus that includes data from the dataset, the trained cross-elasticity ML model being trained to predict demand for complementary item(s) of a given target item based on a price variation of the given target item, wherein the complementary item(s) of the given target item have been identified as inducing or promoting a purchase of the given target item or vice versa;
identifying, by the one or more processors, a specific target item in a shopping basket of a member;
identifying, by the one or more processors, a complementary item of the specific target item; and
modifying, by the one or more processors, a price for the specific target item in the shopping basket to increase a membership response metric score for the member above a threshold, wherein modifying the price for the specific target item comprises using the trained cross-elasticity ML model to calculate a predicted demand for the complementary item based on the modified price for the specific target item and using the trained member response metric ML model to predict the membership response metric score for the member based on the modified price of the target item and the predicted demand for the complementary item.

11. The method of claim 10, wherein the first training corpus includes month-level member transaction feature data.

12. The method of claim 11, wherein the month-level member transaction feature data includes at least one of:
sale data;
saving data;
diversity index of item category;
diversity index of visit;
similarity between consecutive months;
number of months from a last visit;
return rate;
online rate;
self-checkout rate;
application rate;
club pick-up rate; or
fuel rate.

13. The method of claim 10, wherein the first training corpus includes membership renewal data.

14. The method of claim 10, wherein the first training corpus includes statistical data of a geographical region associated with the retail club.

15. The method of claim 10, wherein the first training corpus includes relative price index level data for the retail club.

16. The method of claim 10, wherein the first trained member response metric model is based on a supervised logistic regression algorithm.

17. A non-transitory computer program product storing programming instructions for execution by one or more processors of a system, the programming instructions, upon execution by the one or more processors, causing the system to perform the following operations:
training a first trained member response metric machine learning (ML) model using a first training corpus that includes data from a dataset, the trained member response metric ML model being trained to predict member response metric scores indicating values representing corresponding members' intent to renew membership to a retail club;
training a cross-elasticity ML model using a second training corpus that includes data from the dataset, the trained cross-elasticity ML model being trained to predict demand for complementary item(s) of a given target item based on a price variation of the given target item, wherein the complementary item(s) of the given target item have been identified as inducing or promoting a purchase of the given target item or vice versa;
identifying a specific target item in a shopping basket of a member;
identifying a complementary item of the specific target item; and
modifying a price for the specific target item in the shopping basket to increase a membership response metric score for the member above a threshold, wherein modifying the price for the specific target item comprises using the trained cross-elasticity ML model to calculate a predicted demand for the complementary item based on the modified price for the specific target item and using the trained member response metric ML model to predict the membership response metric score for the member based on the modified price of the target item and the predicted demand for the complementary item.

18. The non-transitory computer program product of claim 17, wherein the first training corpus includes membership renewal data, statistical data of a geographical region associated with the retail club, or relative price index level data for the retail club.

19. The non-transitory computer program product of claim 17, wherein the trained member response metric ML model is trained based on a supervised logistic regression algorithm.

20. The non-transitory computer program product of claim 17, wherein the cross-elasticity ML model is based on a linear regression algorithm.

* * * * *